C. R. STADDEN.
BUTTON CUTTING MACHINE.
APPLICATION FILED JUNE 28, 1913.
1,109,638.
Patented Sept. 1, 1914.
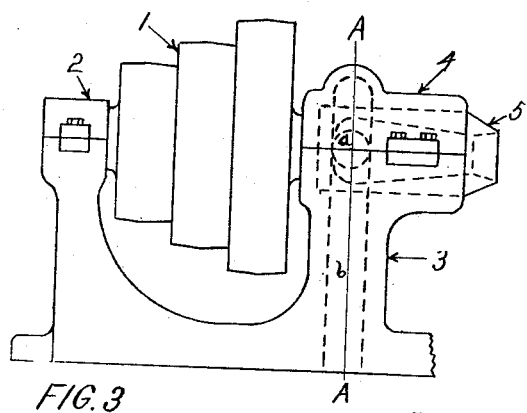
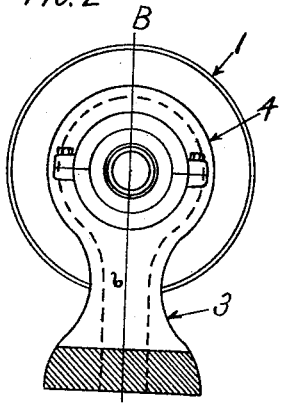
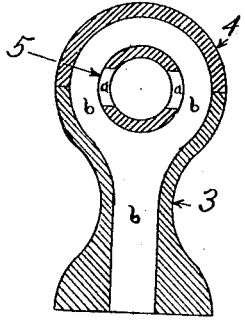
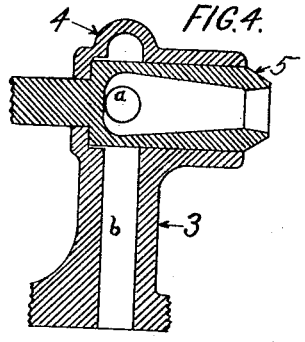
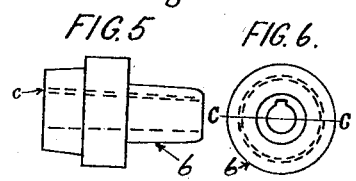
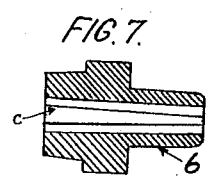
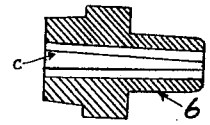
WITNESSES
INVENTOR
Charles R. Stadden
BY
Ely & Bush
ATTORNEYS

UNITED STATES PATENT OFFICE.

CHARLES R. STADDEN, OF DAVENPORT, IOWA.

BUTTON-CUTTING MACHINE.

1,109,638.  Specification of Letters Patent.  Patented Sept. 1, 1914.

Application filed June 28, 1913. Serial No. 776,393.

*To all whom it may concern:*

Be it known that I, CHARLES R. STADDEN, a citizen of the United States of America, residing at Davenport, in the county of Scott and State of Iowa, have invented a new and useful Improvement in Button-Cutting Machines, of which the following is a specification.

My invention relates to button cutting machines in which a saw is used, composed of a small tapered cylinder of thin metal with teeth cut in the smaller end having a wedge shaped opening at one side extending the length of the cylinder, mounted in a suitable spool which in turn is held by a chuck and revolved with the chuck.

In the button cutting machines heretofore in use more or less difficulty has been experienced on account of the vibration or wabbling of the saw and loss of time in wedging the saw tightly within the spool.

The object of my invention is to provide a saw and wedge which can be quickly and readily secured in the spool and to secure the saw and chuck against unnecessary vibration by the mechanism shown in the drawings in which—

Figure 1 is a side elevation showing the frame or support for the chuck and the belt wheels which drive the chuck but showing the chuck in dotted lines, and also showing in dotted lines the openings in the chuck and in the frame for the discharge of the buttons. Fig. 2 is an end view showing the chuck; the spool and saw being omitted, and showing in dotted lines the chamber or discharge opening in the frame; Fig. 3 is a vertical cross section on the line A—A of Fig. 1; Fig. 4 is a vertical longitudinal section of the chuck and its bearings on the line B—B of Fig. 2; Fig. 5 is a side elevation of the saw carrying spool. Fig. 6 is a front end view thereof. Fig. 7 is a vertical longitudinal section of the same taken on the line C—C of Fig. 6. Fig. 8 is a detail end and side view of the wedge on a larger scale; Fig. 9 is a detail end and side view of the saw on a larger scale. Fig. 10 is a vertical longitudinal section of the forward part of the machine on a much larger scale.

Similar characters refer to similar parts throughout the several drawings.

1 are the stepped pulleys located on the shaft which is mounted in bearings 2 of a frame 3.

The saw, 8, is formed of sheet metal in the usual way but the inner edges, instead of being squared, are slightly sharpened or beveled as at *e*. A wedge, 7, is provided fitting the opening in the side of the saw but thicker than the saw, and is provided with grooves, *d—d*, at each edge adapted to receive the beveled edges *e*, of the saw and hold them securely. The thickened portion of the wedge, *d*, is fitted to enter a corresponding key way, *c*, cut in the spool, 6.

Figs. 8 and 9 are enlarged so as to show more clearly the beveled edges of the saw and corresponding grooves of the wedge, 7.

The spool, 6, has one end fitted to enter the open end of the chuck, 5. The chuck, 5, is hollowed out with the smaller end of the opening adjacent to the spool 6, and has the larger end of the opening provided with holes, *a—a*, through which the buttons as they come through the saw, 8, can pass into the chamber, *b*, in the hollow part 3 of the frame to be discharged into any suitable receptacle as desired.

The chuck may be formed integral with the spindle or shaft which drives it or may be formed separately and connected in any suitable manner.

The important difference and improvement in my machine over any of those heretofore used is the firm holding of the saw. In the old style machines the saws wabble so that the " set " of the saws wears off, and the freedom from wabbling in my machine increases the capacity of a saw upon a single filing about one hundred per cent. and also increases the number of buttons which can be obtained from a given shell, as the breaking of the shells due to the wabbling of the old style bearing is prevented.

The tapered saw will operate without binding for the reason that the teeth are set alternately inward and outward so that the button is slightly smaller than the inside of the saw and the shells are not of sufficient thickness to bind owing to the small length of saw which is inserted into the shell, the outward set of half of the teeth making the hole in the shell a little larger than the small end of the saw.

In the operation of my improvement, the saw is inserted in the spool and the wedge placed in the opening in the saw with the sharpened edges of the saw entering the grooves in the wedge and the thickened portion of the wedge entering the key way in the spool and the wedge is lightly driven home. The spool is then inserted in the chuck in the usual way and the long bearing of the frame holds the chuck firmly in place and keeps the saw from wabbling.

What I claim and desire to secure by Letters Patent is:

1. In a button cutting machine, the combination of a frame having a forward part provided with a chamber having a discharge opening and an elongated bearing, a shaft having a hollow chuck formed with discharge openings at its inner end leading to the chamber and mounted in the elongated bearing, a saw carrying spool having a tapering saw opening and mounted in the chuck and a tapering sheet-metal saw mounted in the saw opening of the spool.

2. In a button cutting machine, the combination with an open sided cylindrical saw having its adjacent open edges sharpened, substantially as described herein, of a wedge having grooved edges corresponding to the sharpened edges of the saw.

3. In a button cutting machine, the combination with a spool adapted to receive a cylindrical saw, of a key way formed therein and a thickened saw wedge adapted to enter the key way.

4. In a button cutting machine, the combination with a spool having a key way formed therein, of a thickened wedge corresponding to the key way and having its edges grooved to receive the corresponding edges of the cylindrical saw.

CHARLES R. STADDEN.

Witnesses:
A. G. BUSH,
WINNIFRED JAMES.

---

Copies of this patent may be obtained for five cents each, by addressing the "Commissioner of Patents, Washington, D. C."